US006432254B1

(12) United States Patent
Black et al.

(10) Patent No.: US 6,432,254 B1
(45) Date of Patent: Aug. 13, 2002

(54) WOOD COMPOSITE PREPARED WITH A B-STAGEABLE RESIN

(75) Inventors: Eric P. Black, Covington; Michael E. Hittmeier, Alpharetta; W. Hayes Ingram, Conyers; R. Scott Johnson, Snellville, all of GA (US)

(73) Assignee: Georgia-Pacific Resins Inc., Atlanta, GA (US)

( * ) Notice: Subject to any disclaimer, the term of this patent is extended or adjusted under 35 U.S.C. 154(b) by 489 days.

(21) Appl. No.: 08/979,759

(22) Filed: Nov. 26, 1997

(51) Int. Cl.$^7$ .................................................. C09J 5/02
(52) U.S. Cl. ..................... 156/307.5; 156/335; 156/381; 528/147
(58) Field of Search ............................. 156/307.5, 381, 156/335; 528/147

(56) References Cited

U.S. PATENT DOCUMENTS

| 2,218,373 A | 10/1940 | Alexander |
| 2,473,145 A | 6/1949 | Hesselbart |
| 2,997,096 A | * 8/1961 | Morrison et al. ............ 156/381 |
| 3,485,797 A | 12/1969 | Robins |
| 4,232,067 A | 11/1980 | Coleman |
| 4,239,577 A | 12/1980 | Hartman et al. |
| 4,525,227 A | 6/1985 | Ripkens et al. |
| 4,711,689 A | 12/1987 | Coleman |
| 5,079,332 A | * 1/1992 | Whittemore ................ 528/147 |
| 5,367,040 A | 11/1994 | Teodorczyk |

FOREIGN PATENT DOCUMENTS

| AU | 510845 | 4/1976 |
| CA | 927041 | 5/1973 |
| NZ | 210303 | 2/1988 |

* cited by examiner

Primary Examiner—John J. Gallagher
(74) Attorney, Agent, or Firm—Banner & Witcoff, Ltd.

(57) ABSTRACT

A method for making a consolidated wood product comprising coating wood components with a B-stageable, phenol-formaldehyde resole resin; heating the coated wood components to about 80 to 140° C. for a time sufficient to advance the resin to a B-stage; forming a mat or stack of the wood components coated with the B-stage resin; exposing the mat or stack of coated wood components to a saturated or superheated steam atmosphere in a hot press; and compressing the layup to form the consolidated wood product. The phenol-formaldehyde resole resin used in the method has a number average molecular weight of between about 200 and 600, has a F:P mole ratio of about 1.3:1 to 2.0:1, and has been modified with 0 to about 5.5 wt % of caustic based on resin solids.

12 Claims, No Drawings

WOOD COMPOSITE PREPARED WITH A B-STAGEABLE RESIN

FIELD OF INVENTION

The invention is directed to a wood composite formed using a B-stageable phenol-formaldehyde resin system capable of rapidly curing in a saturated or superheated steam atmosphere.

BACKGROUND OF THE INVENTION

Wood-resin composite products, such as plywood, laminated veneer lumber, oriented strand lumber, oriented strand board, particleboard, medium density fiber board, hardboard and the like, are traditionally made by combining resin with wood components to form a stack or mat which is then consolidated in a hot platen press to cure the resin. The hot pressing process generally relies on a combination of conductive and convective heat flow to provide the necessary heat to cure the resin. The transfer of heat to the wood-resin composite by conductive and convective heat flow becomes increasingly less efficient as the thickness of the wood-resin composite increases.

To produce thicker wood-resin composite products such as laminated veneer lumber and oriented strand lumber efficiently, manufacturer's have begun to use hot presses that use saturated steam as the primary heat transfer medium. When saturated steam is introduced into the wood-resin composite, the steam condenses on the composite components giving up its heat of condensation and rapidly heating the composite. Since the condensation takes place throughout the composite, there is almost no delay in the curing time due to the thickness of the composite. The injection of steam into the composite during hot pressing greatly improves the rate of heating, but the increased moisture from the condensing steam can interfere with the cure of condensation resins such as phenol-formaldehyde resins. Since phenol-formaldehyde resins are widely used in the wood industry and are known to provide cost-effective, strong, highly durable bonds with wood components, it is desirable to have a phenol-formaldehyde resin system suitable for use with steam injection pressing.

SUMMARY OF THE INVENTION

The present invention is directed to a method for making a consolidated wood product comprising coating wood components with a B-stageable, phenol-formaldehyde resole resin; heating the coated wood components to about 80 to 140° C. for a time sufficient to advance the resin to a B-stage; forming a mat or stack of the wood components coated with the B-stage resin; exposing the mat or stack of coated wood components to a saturated or superheated steam atmosphere in a hot press; and compressing the layup to form the consolidated wood product. The phenol-formaldehyde resole resin used in the method has a number average molecular weight of between about 200 and 600, has a F:P mole ratio of about 1.3:1 to 2.0:1, and has been modified with 0 to about 5.5 wt % of caustic based on resin solids.

DETAILED DESCRIPTION OF THE INVENTION

In order to prepare the resin-coated wood components for pressing and to ensure that the resin uniformly coats the wood pieces, the resin must be in a highly fluid state. Thus, dilute resin solutions having a significantly high water content have been used. However, using dilute resin solutions, in turn, creates a greater demand for a drying step (B-staging) prior to pressing to remove most of the water.

Typical phenolic resins used in adhesive formulations for wood composite products have relatively high molecular weights. These resins, when sufficiently diluted to coat the wood components uniformly, become too advanced during the step of B-staging, i.e., they do not properly B-stage. For instance, because they are designed to react (cure) faster, they tend to cure prematurely during the drying stage (B-stage) or they cure too soon during the steam injection pressing cycle.

Simply synthesizing a phenolic resin at a lower molecular weight, however, does not solve the problem because lower molecular weight resins tend to over-penetrate the wood components, leaving insufficient resin on the surface of the wood to act as an adhesive binder. Further, some lower molecular weight phenol-formaldehyde resins emit undesirable levels of formaldehyde during product processing and often yielded reduced physical and mechanical properties in the cured wood-resin composite.

In the present invention, thermosettable, B-stageable, phenol-formaldehyde resole resins were discovered having a degree of molecular weight advancement and caustic levels that are well-suited for the steam injection pressing processes. Suitable phenol-formaldehyde resins of the present invention have low molecular weight advancement which allows the resins to survive the drying stage and cure under a variety of steam pressing conditions.

The B-stageable resins used in the present invention have several advantages such as tolerating a wide range of assembly times. Typical phenol-formaldehyde resins used to prepare wood-resin composite materials are prone to glue-line inactivation when subjected to relatively long assembly times or hot mill conditions. The resin of the present invention can remain in an inert state for at least 30 days following the B-stage process, whereby there is no decrease in the resin's bonding ability during activation in a saturated or superheated steam environment. This long term stability allows the B-staged adhesive to survive lengthy product assembly line stops, permits accumulation and storage of dried (inventory) coated material prior to pressing, and also allows shipping of uncured materials to alternate locations for pressing. The stability of the resin of the present invention has been found to be much less dependent on temperature, up to and exceeding those found in a typical manufacturing setting (i.e., >50° C.).

The low molecular weight B-stageable phenol-formaldehyde resin, used in accordance with the present invention, is synthesized at a F:P mole ratio of about 1.3:1 to 2.0:1, preferably about 1.4:1 to 1.8.0:1, and more preferably about 1.5:1 to 1.7:1. The number average molecular weight of the resin is about 200 to 600, preferably 200 to 500, and more preferably about 240 to 340, determined by gel permeation chromatography (GPC) using polystyrene calibration standards.

Suitable resins may be produced by batch style (one pot) cooks or by "programmed" style (staged addition) cooks. Preferably a batch style cook is used to synthesize the resin since this cook style often provides resins that yield composites having higher internal bond strengths (IB), a higher modulus of elasticity (MOE) and a higher modulus of rupture (MOR) compared to composites made using other resins. In a preferred embodiment, the phenol-formaldehyde resin is prepared by single-stage alkaline condensation ;under a vacuum reflux at a temperature between about 60 and 90° C., preferably above about 80° C., and more preferably about 85° C. The resin is then modified by adding caustic.

The B-stageable resin is preferably modified by adding caustic in an amount to aid the dilution of the resin. It is important not to add too much caustic as it will decrease the properties of the consolidated product by softening the wood and causing over penetration of the resin at the glueline and increased thickness swell properties. Suitable amounts are 0 to 5.5 wt % based on resin solids, preferably 0 to 4 wt %, and more preferably 0.5 to 4 wt %. Suitable caustics include, but are not limited to, sodium hydroxide and potassium hydroxide.

The B-stageable resin may be prepared using reactants that are commercially available in many forms. Formaldehyde is available as paraform (a solid, polymerized formaldehyde) and formalin solutions (aqueous solutions of formaldehyde, sometimes with methanol, in 37%, 44%, or 50% formaldehyde concentrations). Formaldehyde also is available as a gas. Any of these forms is suitable for use in the practice of the invention. Further, the formaldehyde may be partially or totally replaced with any suitable aldehyde as known in the art. Typically, formalin solutions low in methanol are preferred as the formaldehyde source.

The phenol component of the resole resin may include any phenol typically used in preparing phenolic resole resins, which is not substituted at either the two ortho positions or at one ortho and the para position. These unsubstituted positions are necessary for the desired polymerization reaction to occur. Phenols substituted in these positions may be used in lesser quantities (e.g., up to about 30 weight % of the phenol component) as it is known in the art to control molecular weight by a chain termination reaction. Any one, all, or none of the remaining carbon atoms of the phenol ring can be substituted in a conventional fashion. The nature of these substituents can vary widely, and it is only necessary that the substituent not interfere in the polymerization of the aldehyde with the phenol at the ortho and/or para positions. Furthermore, at least a portion of the phenol component must include a phenol not blocked at the ortho and para positions so that the resin is thermosettable. Preferably, at least 10% by weight of the phenol component should include such tri-functional phenol and usually the phenol component consists essentially entirely of such tri-functional phenol. Substituted phenols which optionally can be employed in the formation of the phenolic resins include alkyl substituted phenols, aryl substituted phenols, cycloalkyl substituted phenols, alkenyl substituted phenols, alkoxy substituted phenols, aryloxy substituted phenols, and halogen substituted phenols, the foregoing substituents possibly containing from 1 to 26, and usually from 1 to 9, carbon atoms.

Specific examples of suitable phenols for preparing the resole resin composition of the present invention include: hydroxy benzene (phenol), o-cresol, m-cresol, p-cresol, 3,5-5 xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5 dicyclohexyl phenol, p-phenyl phenol, p-phenol, 3,5-dimethoxy phenol, 3,4,5 trimethoxy phenol, p-ethoxy phenol, p-butoxy phenol, 3-methyl-4-methoxy phenol, p-phenoxy phenol, naphthol, anthranol and substituted derivatives thereof. Ordinary phenol (hydroxy benzene) normally is preferred for most applications based on cost and availability.

An alkaline catalyst promotes the reaction of the formaldehyde with phenol to form a resole resin, and is usually one of the inorganic or organic alkaline catalysts known to be useful in preparing phenol-formaldehyde resole resins. Typical catalysts include alkali metal hydroxides, such as sodium hydroxide, lithium hydroxide, potassium hydroxide, or mixtures thereof, generally sodium hydroxide is preferred for cost and availability. Other catalysts include alkali metal carbonates such as sodium carbonate and potassium carbonate, alkaline earth hydroxides such as magnesium hydroxide, calcium hydroxide and barium hydroxide, and amines. The catalyst is used in a low but effective amount to catalyze the reaction. Lower effective amounts of catalyst give lower molecular weight resins at a given viscosity and are safer to use. Safe but effective amounts include about 0.1 to 2 wt % based on the resin, preferably about 0.1 to 0.7 wt %, most preferably about 0.5 wt %.

During the process of preparing the resole resin adhesive of the present invention, a variety of other modifiers can be added, usually in small amounts, into the resole resin in order to improve toughness and other cured resin properties. These modifiers include, for example, chain terminating phenols, glycols, with or without halogen substitution for additional fire retardancy, polyester polyols, alkyl phenols, hydroxy-containing acrylates, latexes, polyvinyl acetates, and the like and mixtures thereof The proportion of such modifiers incorporated into the resole resin typically ranges from 5 to 35 weight percent (based on the phenol component.)

Other modifiers such as fire retardants, lubricants, defoamers, plasticizers, softening agents, pigments and fillers also can be added to the resin composition. Reactive modifiers such as di- and higher polyols, e.g., di- or polyhydric phenols, resorcinol, phloroglucinol, and the like, can be added to the resole resin after it has been formulated.

Water is added to dilute the resin to 10 to 72 wt % resin-solids, preferably about 20 wt % resin solids, and then the resin solution is applied to wood components in any suitable manner, such as spraying, flooding, or dipping. The dilution of the resin may be adjusted to ensure the complete coating of the surfaces of the wood components by applying the appropriate level of resin solids. The water tolerance of the resins is controlled by adding caustic or by emulsifying the resin. The resin coated wood components are then dried and the resin advanced to a B-stage in an oven at 80 to 140° C. to remove the water.

The B-staged resin is resistant to heat and loss of water and maintains its ability to thermoset and bond the end product. In addition, the resin provides efficient coverage of the wood surfaces flowing into gaps and microfissures without over penetrating the wood components. The partially advanced (B-staged) resin has a high resistance to dilution in the steam atmosphere, that is the B-staged resin is resistant to wash out from the glue line. The wood-resin composites made as described above, exit the press at end-use moisture contents. Therefore, they have excellent dimensional stability. End-use moisture contents are typically 6–15 wt %, more typically 6–11 wt % based on the dry wood.

Further, the resin does not produce undesirable formaldehyde emissions during curing. The formaldehyde content of the resin is usually less than 2.0 wt % based on resin solids, more usually less than 1.5 wt %. This results in lower-formaldehyde emissions.

A mat or stack of resin-coated wood components is exposed to a saturated or superheated steam atmosphere, typically at a temperature of about 100 to 190° C. and preferably at a temperature of about 140 to 160° C., in a hot press and the layup is compressed to form the consolidated wood product. The pressure is dictated by the temperature to achieve saturated or superheated steam, and is generally between 15 and 180 psia. The steam may be injected into a sealed chamber of the hot press.

All types of wood components, including strands, flakes, veneer, chips, fibers, wafers, particles, and the like, may be consolidated using the above method. In particular, green wood components may be used which heretofore did not provide adequate wood-resin composite final properties. Green wood is generally defined as wood having a moisture content of greater than 30 wt % based on the dry wood. Partially dried wood is generally defined as wood having a moisture content of between 10 and 30 wt %. Dried wood is generally defined as wood having a moisture content of under 10 wt %. The use of green wood is achieved by utilizing a B-stageable resin whereby the resin is applied to the green wood and then the wood and resin are dried together in an oven until the resin reaches a B-stage and the moisture content of the wood-resin combination is reduced to 5 to 15 wt % based on the wood and resin together as discussed above.

In steam injection pressing, steam is introduced into a mat of resin-treated wood components. The steam condenses inside the mat and heats it quickly and uniformly to a high temperature. This high temperature causes rapid curing of the resin and allows for short pressing cycles. The high temperatures are immediately available to the entire mat and the pressing time is essentially independent of mat thickness if a satisfactory quantity of steam is provided to the mat. Air trapped in the mat can prevent the steam from being uniformly distributed throughout the mat and must be removed to achieve satisfactory results. Air is pushed out of the mat by the steam or removed by a vacuum system and vented to the outside by suitable valving and control systems.

There are several ways of configuring steam injection presses to control press cycle, steam usage and product properties, and these are achieveable with commercial presses such as an open sided press sold by Siempelkamp. The most common steam injection pressing system injects the steam into the mat through perforations in the hot platens as the press is being closed. Steam pressure and distribution in the mat is controlled by the rate of closing and the timing of the steam injection. Air and steam flow through the mat and out through the edges of the mat. This method generally requires more steam than closed steam injection systems, but it is currently the only steam injection system being used in commercial operations.

A second method also injects steam into the mat through perforations in the hot platens, but provides a seal between the top and bottom platen to control the flow of steam in the mat. The seal is formed by a frame on the top platen which compresses the mat edges to a high density and allows for a more controlled injection of the steam. The high density mat edges must be removed when the board is trimmed and this generally results in a greater loss of raw materials. The self-sealing steam injection system also allows higher pressures and temperatures to develop in the mat and can be used with higher temperature curing resins.

A third steam injection system introduces the mat into a chamber that can be closed and pressurized with steam before the press platens are closed. This system allows the use of high steam pressures and more precise control of steam usage, press cycle and product properties. This steam injection system is more mechanically complex and requires the press platens to be enclosed in a pressure vessel.

The process of the present invention presses wood components into thick engineered wood-resin composites having little density variation throughout cross sections of the composite. This uniformity, combined with low thickness swell values, provides consolidated wood product which closely resembles solid wood products.

In one embodiment of the present invention, a press load is prepared by treating wood strands having a moisture content of 30–60% with a 20% resin solids aqueous solution. The resin-treated strands are then dried to 5–10% moisture content in a forced air oven. An amount of the material which will give the correct final board density is then loaded into the press. Saturated or superheated steam is introduced into the wood-resin combination to raise the temperature of the composition to 150° C. Concurrently, the mat is consolidated by press platens to obtain the desired wood composite thickness. The combination of temperature and pressure is maintained until the resin is cured. Pre-and post-conditioning steps may be necessary to optimize final physical properties of the wood-resin composite. For example, a presteaming of the wood-resin combination will soften the wood and optimize mat consolidation. Additionally, a decompression cycle before opening the press removes moisture and reduces stress on wood-resin composite.

EXAMPLES

The invention will be further described by reference to the following examples. These examples should not be construed in any way as limiting the invention to anything less than that which is disclosed or which could have been obvious to anyone skilled in the art.

Example 1

(Resin Preparation)

Phenol (50 wt %) was mixed with a 50% aqueous solution of formaldehyde (47% wt formaldehyde). Caustic (1 wt %) added as a (50% sodium hydroxide solution) was added to the phenol-formaldehyde mixture. The mixture was cooked out at 85° C. to a low free formaldehyde level. The resin was distilled by vacuum distillation to remove water (15 wt %). Urea (1 wt %) was added during the distillation to bring free formaldehyde to a final desired level (<1 wt %). Diethylene glycol (1 wt %) was added at the end of the cook to enhance resin penetration during application. The resin had a final F:P mole ratio of 1.5:1.

Example 2

(Wood Composite Consolidation)

Wood strands from southern yellow pine, dried to 30 wt % moisture content, were coated using a 20 wt % resin solids solution of thermosetting phenol-formaldehyde resin of Example 1. Caustic (4 wt % based on dry resin solids) was added to aid resin dilution. Resin application was achieved by immersing the strands in a resin bath. The resin treated strands were then B-staged (dried) to 10–12 wt % moisture content based on dry wood, at 80° C. using a forced air oven. Based on the final press closure dimensions and moisture content of the strands, an amount of material was used to produce a final consolidated product with a density of 40–48 lb/ft$^3$. The composite was consolidated using a steam injection press cycle that included one minute of presteaming at 150° C./75 psi, followed by pressing at 150° C. to a final thickness of 5 cm until the resin cured (approximately 4–5 minutes).

Example 3

Several low molecular weight phenol-formaldehyde resins were prepared. All of the resins were cooked to have <2 wt % level of free formaldehyde based on dry resin solids. The resins differed in several properties including F:P mole ratios, free phenol levels, added caustic levels, and water tolerance (Table 1).

TABLE 1

| Resin | Mole Ratio | Free Phenol* | Free HCHO* | % Caustic* | Water Tolerance* |
|---|---|---|---|---|---|
| 1 (inv) | 1.5 | 15 | 1.5 | 2.0 | 2.0:1 |
| 2 (inv.) | 1.74 | 13.5 | 1.5 | 2.2 | Infinite |
| 3 (comp.) | 2.15 | 2 | 0.4 | 4.7 | 24:1 |
| 4 (comp.) | 2.56 | 1.5 | 1.5 | 7.1 | 38:1 |

*based on total dry resin solids

TABLE 2

| Resin | $M_n$ | $M_w$ | $M_z$ |
|---|---|---|---|
| 1 | 390 | 483 | 625 |
| 3 | 365 | 416 | 473 |
| 4 | 753 | 1089 | 1589 |
| 5 | 501 | 552 | 601 |

Resin 1 was prepared in accordance with Example 1, with 4 wt % based on dry resin solids additional caustic (sodium hydroxide) added to aid dilution of the resin.

Resin 2 was prepared by initially forming sodium phenolate by adding caustic (50% solution) (2.5 wt %) to phenol (43 wt %). To this mixture a programmed charge of formaldehyde (50% solution) (48 wt %) was subsequently added. The resin was cooked to <2 wt % free formaldehyde and ethylene glycol (7 wt %) was added for penetration enhancement. The resin was cooked at 60° C. in order to maintain infinite water tolerance.

Resin 3 was prepared by initially charging phenol (31 wt %), formaldehyde (50% solution) (about 7 wt %) and water (20 wt %). Caustic (50% solution) (2 wt %) was subsequently added followed by a programmed formaldehyde charge (50% solution) (35 wt %). A second charge of caustic 50% solution (2 wt %) was added between two viscosity holds. Urea (3 wt %) was added at the end of the cook to consume excess formaldehyde.

Resin 4 was prepared by charging phenol (34 wt %), formaldehyde (50% solution)(about 56 wt %) and potassium hydroxide (about 8 wt %). The reaction was allowed to exotherm to about 60° C. and cooked until a free formaldehyde level of 2.5 wt % was reached. Urea (about 2 wt %) was added at the end of the cook prior to cooling.

Resin 1A was prepared by modifying Resin 1 by increasing the amount of caustic to 4.85 wt %. Resin 3A was prepared by adding phenol to Resin 3 to determine the effect of free phenol in the resin.

TABLE 3

| Resin | % Caustic* | Free Phenol |
|---|---|---|
| 1 | 2.0 | 15% |
| 1A | 4.85 | 15% |
| 3 | 4.7 | 2.1% |
| 3A | 4.7 | 15% |

Example 4

Wood-resin composites were prepared using Resins 1, 1A, 2, 3 and 3A in accordance with the following conditions.

TABLE 4

| Starting Material | Strands Pre-Resinated Moisture Content | Slash Pine, 1 meter length 20% |
|---|---|---|
| Resination of wood strands | Target Resin Solids | 8% |
|  | Post B-Stage Moisture Content | 8% |
| Press Parameters | Target Density | 40–48 lb/ft³ |
|  | Product Size (1x w x h) | 100 × 20 × 5 cm |
|  | Finished Product Size | 100 × 20 × 4 cm |
|  | Products per Condition | 4 |
| Testing | Physical Properties | Internal Bond |
|  |  | Modulus of Elasticity |
|  |  | Modulus of Rupture |
|  | Dimensional Stability | Water Absorption |
|  |  | Thickness |

The results are presented in the table below and were measured from samples with 8% resin loading.

TABLE 5

Average Final Properties

| Resin | Density (lb/ft³) | IB (psi) | MOE × 10⁶ (psi) | MOR (psi) | 2 Hour Boil Thickness Swell (%) | VPS Water Absorption (%) |
|---|---|---|---|---|---|---|
| 1 (inv.) | 47.3 | 181 | 2.22 | 8568 | 5.8 | 62 |
| 1a (inv.) | 46.3 | 100 | 1.85 | 5598 | 4.9 | 60 |
| 2 (comp.) | 46.1 | 85 | 1.94 | 4607 | 5.3 | 69 |
| 3 (comp.) | 44.8 | 11 | 1.50 | 2931 | 9.8 | 75 |
| 3a (comp.) | 44.8 | 7 | 1.22 | 2127 | 10.2 | 70 |
| 4 (comp.) | 44.3 | 19 | 1.54 | 2793 | 7.8 | 70 |

Example 5

Four resins were prepared using two different F/P mole ratios for each of two different cook styles. The mole ratios used were 1.74 and 1.50.

The first two cooks (Resins 5 and 6) involved programming a formaldehyde charge into a sodium phenolate solution using the same process as Resin 2 in Example 3. The hold period to advance the resin and lower the free formaldehyde level was carried out at 60° C. in order to maintain infinite water tolerance.

The second two cooks (Resins 7 and 8) were a batch style procedure wherein all phenol and formaldehyde were charged to the kettle, and caustic (1 wt %) was slowly added to initiate the reaction. The resins were cooked out to a low level of free formaldehyde (<2 wt %) utilizing a cook temperature of 85° C. At the conclusion of the cook 4 wt % caustic based on dry solids was added to raise the water tolerance to a level suitable for application. The amount of caustic was the same as the level of caustic used for the other resins in an attempt to maintain consistency.

Properties for the four resins are listed below.

TABLE 6

| Resin | Mole Ratio | Free* Phenol | Free* HCHO | %* Caustic | Water* Tolerance |
|---|---|---|---|---|---|
| 5 | 1.74 | 10.3% | 1.5% | 1.5% | Infinite |
| 6 | 1.50 | 16.2% | 1.2% | 1.9% | Infinite |
| 7 | 1.74 | 8.9% | 1.6% | 1.4% | 3:1 |
| 8 | 1.50 | 16.0% | 1.4% | 1.4% | 3:1 |

*based on total dry resin solids

TABLE 7

| Resin | $M_n$ | $M_w$ | $M_z$ |
|---|---|---|---|
| 5 | 276 | 363 | 479 |
| 6 | 240 | 300 | 473 |
| 7 | 344 | 579 | 984 |
| 8 | 285 | 448 | 757 |

The resins were diluted to 20% solids and poured over freshly prepared Southern Pine strands which had been dried to 20% moisture content prior to treatment. Following the resin treatment, the strands were redried to 8% moisture content. Samples were prepared from the material and pressed in a saturated steam atmosphere.

TABLE 8

| Starting Material | Strands Pre-Resinated Moisture Content | Slash Pine, 1 meter length 20% |
|---|---|---|
| Resination of wood strands | Target Resin Solids | 8% |
| | Post B-Stage Moisture Content | 8% |
| Press Parameters | Target Density | 40–48 lb/ft$^3$ |
| | Product Size (l x w x h) | 100 × 20 × 5 cm |
| | Finished Product Size | 100 × 20 × 4 cm |
| | Products per Condition | 2 |
| Testing | Physical Properties | Internal Bond |
| | | Modulus of Elasticity |
| | | Modulus of Rupture |
| | Dimensional Stability | Water Absorption |
| | | Thickness |

TABLE 9

| Resin | Density (lb/ft$_3$) | IB (psi) | MOE × 10$^6$ (psi) | MOR (psi) | 24 Hour Thickness Swells (%) |
|---|---|---|---|---|---|
| 5 | 44.0 | 90 | 1.60 | 7343 | 4.5 |
| 6 | 43.7 | 92 | 1.52 | 6264 | 4.0 |
| 7 | 42.8 | 83 | 1.58 | 7300 | 4.3 |
| 8 | 42.9 | 119 | 1.79 | 8885 | 4.7 |

Results of the internal bond (IB) strength testing showed Resin 8 produced significantly stronger bonds than the other three resins. Resins 6 & 8, with F/P mole ratios of 1.50, had higher IB values than Resins 5 & 7, with 1.74 mole ratio resins. The cook style did not yield any significant differences; however, the "batch" style cooks gave the higher average IB results.

The bending properties of the boards were measured using Modulus of Elasticity (MOE) and Modulus of Rupture (MOR) tests. The MOE results showed the boards prepared using Resin 8 were statistically stiffer than the boards prepared from the other resins. The MOR data showed less distinct differences between the resins, although boards prepared using Resin 8 had the highest average bending strength of the four. Neither cook style nor the mole ratio were found to yield resins which produced composites having significantly different bending results. The 24-hour thickness swells for all four resins were excellent at 4.0 to 4.7%.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A method for making a consolidated wood product comprising coating wood components with a B-stageable, phenol-formaldehyde resole resin; heating the coated wood components to about 80 to 140° C. for a time sufficient to advance the resin to a B-stage; forming a mat or stack of the wood components coated with the B-stage resin; exposing the mat or stack of coated wood components to a saturated or superheated steam atmosphere in a hot press and compressing the layup to form the consolidated wood product; wherein the B-stageable phenol-formaldehyde resole resin has a number average molecular weight of between about 200 and 600, has a F:P mole ratio of about 1.3:1 to 2.0:1, and has been modified with 0 to about 5.5 wt % of caustic based on resin solids.

2. The method of claim 1 wherein the phenol-formaldehyde resole resin has a number average molecular weight of between about 200 and 500.

3. The method of claim 1 wherein the phenol-formaldehyde resole resin has a F:P mole ratio of about 1.4:1 to 1.8:1.

4. The method of claim 1 wherein the phenol-formaldehyde resole resin has been modified with 0 to about 4 wt % of caustic based on resin solids.

5. The method of claim 1 wherein the phenol-formaldehyde resole resin has been modified with about 0.5 to 4 wt % of caustic based on resin solids.

6. The method of claim 1 further comprising providing a saturated or superheated steam atmosphere at a temperature of about 100 to 190° C.

7. The method of claim 6 further comprising providing a saturated or superheated steam atmosphere at a temperature of about 140 to 160° C.

8. The method of claim 1 wherein the mat or stack is comprised of wood strands, flakes, veneer, particles, chips, fibers, or mixtures thereof.

9. The method of claim 1 wherein the wood components have a moisture content greater than 30 wt % based on weight of the dry wood components.

10. In a method for making a consolidated wood product comprising coating wood components with a B-stageable phenol-formaldehyde resole resin, forming a mat or stack of coated wood components; heating the mat or stack of resin-coated wood components sufficiently to advance the resin to a B-stage; exposing the wood-resin composite to saturated or superheated steam; compressing the composite to form the consolidated wood product, the improvement comprising coating the wood components with a B-stageable phenol-formaldehyde resin having a number average molecular weight between about 200 and 600, a F:P mole ratio of about 1.3:1 to 2.0:1, and modified with 0 to about 5.5 wt % of caustic based on resin solids.

11. The method of claim 10 wherein the steam is injected into a sealed chamber in the hot press.

12. The method of claim 1 wherein the steam is injected into a sealed chamber in the hot press.

* * * * *